US012731574B2

(12) United States Patent
Zhang et al.

(10) Patent No.: US 12,731,574 B2
(45) Date of Patent: Sep. 8, 2026

(54) METHOD FOR OUTPUTTING SPEECH DATA WITH CONSISTENT SPEECH STYLE, ELECTRONIC DEVICE, AND STORAGE MEDIUM

(71) Applicant: NETEASE (HANGZHOU) NETWORK CO., LTD., Hangzhou (CN)

(72) Inventors: Haitong Zhang, Hangzhou (CN); Jiapeng Huo, Hangzhou (CN); Yue Lin, Hangzhou (CN)

(73) Assignee: NETEASE (HANGZHOU) NETWORK CO., LTD., Hangzhou City (CN)

( * ) Notice: Subject to any disclaimer, the term of this patent is extended or adjusted under 35 U.S.C. 154(b) by 98 days.

(21) Appl. No.: 18/681,533

(22) PCT Filed: May 25, 2022

(86) PCT No.: PCT/CN2022/095008
§ 371 (c)(1),
(2) Date: Feb. 6, 2024

(87) PCT Pub. No.: WO2023/071166
PCT Pub. Date: May 4, 2023

(65) Prior Publication Data
US 2024/0339107 A1 Oct. 10, 2024

(30) Foreign Application Priority Data
Oct. 25, 2021 (CN) ......................... 202111241373.4

(51) Int. Cl.
*G10L 13/10* (2013.01)
*A63F 13/54* (2014.01)
(Continued)

(52) U.S. Cl.
CPC .............. *G10L 13/10* (2013.01); *A63F 13/54* (2014.09); *G10L 13/033* (2013.01); *G10L 13/04* (2013.01);
(Continued)

(58) Field of Classification Search
CPC ....... G10L 13/10; G10L 13/033; G10L 13/04; G10L 15/02; G10L 15/30; G10L 2015/025; A63F 13/54
See application file for complete search history.

(56) References Cited

U.S. PATENT DOCUMENTS 6,676,523 B1 1/2004 Kasai et al.
6,826,530 B1 11/2004 Kasai et al.
(Continued)

FOREIGN PATENT DOCUMENTS

CN 1282017 A 1/2001
CN 105304080 A 2/2016
(Continued)

OTHER PUBLICATIONS

Blaise Potard, Matthew P. Aylett, Christopher J. Pidcock, "Proper name splicing in computer games with TTS", 10.21437/Interspeech. 2012-592. (Year: 2012).*
International Search Report dated Aug. 31, 2022 of International Application No. PCT/CN2022/095008.

*Primary Examiner* — Pierre Louis Desir
*Assistant Examiner* — Daniel W Chung
(74) *Attorney, Agent, or Firm* — Qinghong Xu

(57) ABSTRACT

A data processing method, and a storage medium and an electronic device. The method includes: receiving a target request from a client, wherein information carried in the target request at least includes a target text, and the target text is configured for representing a name of a virtual game character; in response to the target request, converting the target text into first speech data; and sending the first speech
(Continued)

data to the client, such that the client splices the first speech data and second speech data into third speech data, wherein the second speech data includes a content, other than the name of the virtual game character, in an interaction content to be proceeded by the virtual game character.

14 Claims, 5 Drawing Sheets

(51) Int. Cl.
*G10L 13/033* (2013.01)
*G10L 13/04* (2013.01)
*G10L 15/02* (2006.01)
*G10L 15/30* (2013.01)

(52) U.S. Cl.
CPC .............. *G10L 15/02* (2013.01); *G10L 15/30* (2013.01); *G10L 2015/025* (2013.01)

(56) References Cited

U.S. PATENT DOCUMENTS 11,790,884 B1 * 10/2023 Shakeri ................. G10L 21/007
704/258
2011/0046943 A1 2/2011 Lee et al.
2019/0108830 A1 * 4/2019 Pollet ...................... G10L 13/07

FOREIGN PATENT DOCUMENTS

CN 107871494 A 4/2018
CN 109584859 A 4/2019
CN 110534088 A 12/2019
CN 111785246 A 10/2020
CN 112270920 A 1/2021
CN 113053357 A 6/2021
CN 113539234 A 10/2021
CN 113920983 A 1/2022

* cited by examiner

METHOD FOR OUTPUTTING SPEECH DATA WITH CONSISTENT SPEECH STYLE, ELECTRONIC DEVICE, AND STORAGE MEDIUM

CROSS REFERENCE TO RELATED APPLICATIONS

The present disclosure is a U.S. national phase application of International Application No. PCT/CN2022/095008, filed on May 25, 2022, which is based upon and claims priority to Chinese Patent Application No. 202111241373.4, filed on Oct. 25, 2021 and entitled "DATA PROCESSING METHOD, AND APPARATUS, STORAGE MEDIUM AND ELECTRONIC DEVICE THEREOF", the entire contents of both of which are incorporated herein by reference for all purposes.

TECHNICAL FIELD

The present disclosure relates to the field of computer technology, in particular to a data processing method, a data processing apparatus, a storage medium and an electronic device.

BACKGROUND

At present, it is possible to name a virtual game character in games. The name of the virtual game character is usually presented in text form, and is usually displayed in a text chatting interface, a team interface, personal information and other functional display interfaces.

SUMMARY

According to one aspect of the present disclosure, a data processing method is provided. The method can include: receiving a target request from a client, wherein information carried in the target request includes at least a target text, and the target text is configured to represent a name of a virtual game character; converting, in response to the target request, the target text into first speech data; and sending the first speech data to the client, wherein the first speech data is configured to be spliced with second speech data by the client to obtain third speech data, the second speech data being speech data corresponding to a content other than the name in an interaction content to be proceeded by the virtual game character.

According to another aspect of the present disclosure, a data processing method is also provided. The method can include: sending, in response to detecting that an interaction content to be proceeded by a virtual game character includes a name of the virtual game character, a target request to a server, wherein information carried in the target request includes at least a target text, and the target text is configured to represent the name: acquiring first speech data, wherein the first speech data is obtained by the server by converting the target text in response to the target request: obtaining third speech data by splicing the first speech data and second speech data, wherein the second speech data is speech data corresponding to a content other than the name in the interaction content; and playing the third speech data.

According to another aspect of the present disclosure, a non-transitory computer-readable storage medium is provided. The computer-readable storage medium stores a computer program, wherein a device on which the computer-readable storage medium is located is controlled to implement the data processing method according to any of embodiments of the present disclosure when the computer program is executed by a processor.

According to another aspect of the present disclosure, an electronic device is provided. The electronic device includes a memory and a processor, wherein the memory stores a computer program, and the processor is configured to execute the computer program to cause the data processing method according to any of embodiments of the present disclosure to be implemented.

BRIEF DESCRIPTION OF THE DRAWINGS

The drawings described herein, which constitute a part of the present disclosure, are intended to provide a further understanding of the present disclosure. The illustrative embodiments and their descriptions of the present disclosure are used to explain the present disclosure and not considered to be an improper limitation of the present disclosure, in which.

DETAILED DESCRIPTION

It should be noted that, embodiments and features in the embodiments of the present disclosure can be combined with each other without conflict. A detailed explanation of the present disclosure will be provided in the following in combination with embodiments and with reference to the drawings.

In order to enable those in the art to better understand the present disclosure, a clear and complete description of the embodiments of the present disclosure will be provided in the below in combination with the drawings. It is apparent that the embodiments described are only a part of the embodiments of the present disclosure, not all of them. Based on the embodiments of the present disclosure, any other embodiment obtained by those skilled in the art without any creative efforts will fall within the protection scope of the present disclosure.

It should be noted that terms "first", "second", etc. in the specification, claims, and drawings of the present disclosure are used to distinguish similar objects, and do not necessarily need to be used to describe a specific order or sequence. It should be understood that the data used in this way can be interchanged in appropriate cases, so that embodiments described can be implemented in an order other than those illustrated or described herein. In addition, terms "include" and "have", as well as any variations thereof, are intended to cover non-exclusive inclusion. For example, the process, method, system, product, or equipment that includes a series of steps or units need not be limited to those clearly listed steps or units, but can include other steps or units that are not clearly listed or inherent to the process, method, product, or equipment.

In a dialogue between virtual game characters, the name of the virtual game character is usually skipped when the dialogue is carried out, and only other text content that can be fixed is read, or virtual game character is referred to in other fixed ways set in the game.

There is no interaction between the name of the virtual game character and the virtual game character in the above, which causes a player to have a relatively fragmented understanding of the virtual game character and its own identity, leading to a technical problem of poor interactivity for the name of the virtual game character.

Regarding the technical problem of poor interactivity for the name of the virtual game character in the prior art, no effective solutions have been proposed currently to solve the problem.

Figure 1:
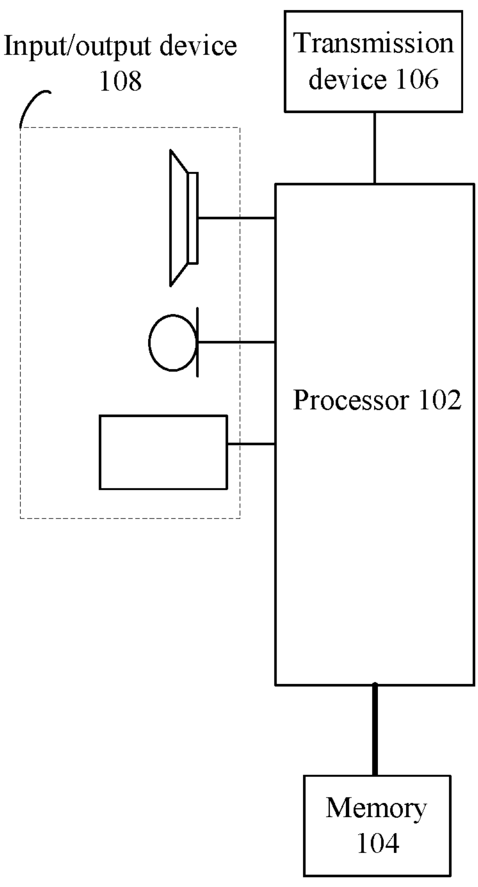
FIG. 1 is a block diagram of a hardware structure of a mobile terminal for a data processing method according to one or more embodiments of the present disclosure.

The method provided in embodiments of the present disclosure can be performed on mobile terminals, computer terminals, or similar computing devices. FIG. 1 is a block diagram of a hardware structure of a mobile terminal for a data processing method according to one or more embodiments of the present disclosure, taking running on a mobile terminal as an example. As shown in FIG. 1, the mobile terminal can include one or more (only one is shown in FIG. 1) processors 102 (which can include but are not limited to processing devices, for example, microprocessors such as MCU, or programmable logic devices such as FPGA) and a memory 104 for storing data. In some embodiments, the above mobile terminal can also include a transmission device 106 for communication functions and an input/output device 108. Those of ordinary skill in the art would understand that the structure shown in FIG. 1 is only for illustration and does not limit the structure of the mobile terminal mentioned above. For example, the mobile terminal can also include more or fewer components than shown in FIG. 1, or have configurations different from that shown in FIG. 1.

The memory 104 can be configured to store a computer program, such as a software program and a module of application software. For example, a computer program corresponding to a data processing method in embodiments of the present disclosure. The processor 102 executes various functional applications and data processing by running the computer program stored in memory 104, that is, implementing the above method. The memory 104 can include high-speed random access memory, and the memory 104 can also include a non-volatile memory, such as one or more magnetic storage devices, flash memories, or other non-volatile solid state memories. In some embodiments, the memory 104 can further include a memory remotely arranged relative to the processor 102, which can be connected to the mobile terminal through a network. The examples of the above network include but are not limited to Internet, Intranet, local area network, mobile communication network, and combinations thereof.

The transmission device 106 is configured to receive or send data through a network. The examples of the above network can include a wireless network provided by communication providers for the mobile terminal. In some embodiments, the transmission device 106 includes a network interface controller (NIC) that can be connected to other network devices through a base station for communication with the Internet. In some embodiments, the transmission device 106 can be a Radio Frequency (RF) module, which is configured for wireless communication with the Internet.

A data processing method according to one or more embodiments of the present disclosure will be introduced in the following from a server side (service side).

Figure 2:
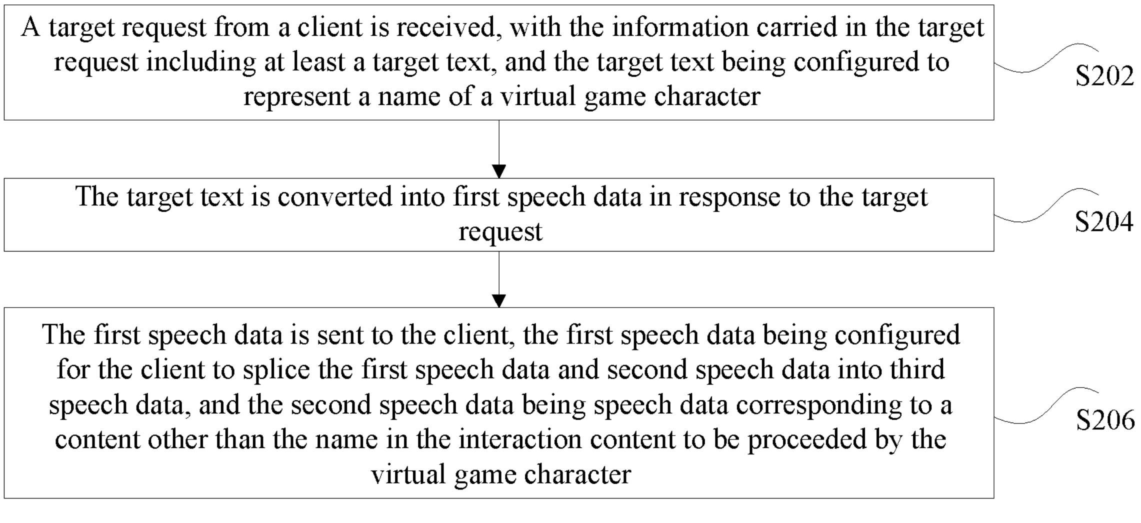
FIG. 2 is a flowchart of a data processing method according to one or more embodiments of the present disclosure.

FIG. 2 is a flowchart of a data processing method according to one or more embodiments of the present disclosure. As shown in FIG. 2, the method can include following steps.

In step S202, a target request from a client is received, with the information carried in the target request including at least a target text, and the target text being configured to represent a name of a virtual game character.

In some examples provided in the above step S202 of the present disclosure, the client can be a game client, and the virtual game character is included in a game scenario running on the game client. For example, the virtual game character is a non-player character (NPC). When an interaction content to be proceeded by the virtual game character includes a name of the virtual game character (for example, when the interaction content includes the name of the virtual game character named by a player), the server can receive a target request from the above client. The information carried in the target request includes at least a target text, which is also referred to as a name text to be synthesized, and the target text is configured to represent the name of the virtual game character mentioned above. In some embodiments, the interaction content can be a content of a dialogue carried out by virtual game characters.

In step S204, the target text is converted into first speech data in response to the target request.

In some examples provided in the above step S204 of the present disclosure, after receiving the target request from the client, the server converts the target text into first speech data in response to the target request.

In some embodiments, after receiving the target request from the client, the server can recognize the target text from the target request, and then input the target text into a speech generation model configured by the server in advance. The target text is processed through the speech generation model, to obtain the first speech data that matches with the name of the virtual game character. This stage is also known as a stage during which the name is synthesized to a speech. In some embodiments, the speech generation model can be an Artificial Intelligence (AI) model, or a training model. That is, the speech generation model can be an AI speech generation model, or an AI training model. The first speech data, which is also referred to as a speech synthesized from a name or a speech synthesized from a name text, can be embodied through speech waveforms/signals, and thus achieving the purpose of feedback on the name of the virtual game character through the first speech data.

In some embodiments, matching between the first speech data and the name of the virtual game character can mean that a speech content of the first speech data includes the name of the virtual game character, a timbre of the first speech data is a leading role timbre of the virtual game character, a tone of the first speech data is as close as possible to a contextual speech, and a speech length of the first speech data is in line with a speaking speed of the leading role in whole.

In some embodiments, the target text can be converted into the first speech data in a text-to-speech system with a reference audio on the server.

In some embodiments, the server can configure speech generation models corresponding to each of virtual game characters in the game in advance.

In step S206, the first speech data is sent to the client, the first speech data being configured for the client to splice the first speech data and second speech data into third speech data, and the second speech data being speech data corresponding to a content other than the name in the interaction content to be proceeded by the virtual game character.

In some examples provided in the above step S206 of the present disclosure, after the target text is converted into the first speech data in response to the target request, the first speech data can be sent to the client, so that the client can splice the first speech data and the second speech data into the third speech data. The second speech data is speech data corresponding to a content other than the name in the interaction content to be proceeded by the virtual game character.

In some embodiments, the current interaction content to be proceeded includes a content other than the name of the virtual game character, and the content other than the name of the virtual game character corresponds to the second speech data. The second speech data can be an audio, that is, the second speech data can be an audio to be used to be spliced with the first speech data. After the first speech data is received by the client, the first speech data and the second speech data can be spliced by the client. In some embodiments, the client splices the first speech data and the second speech data based on sampling points for the first speech data and sampling points for the second speech data. The sampling points can include time information. The third speech data can be obtained by splicing the first speech data and the second speech data, and the third speech data is played by the client.

According to some embodiments, the third speech data includes speech data corresponding to the name of the virtual game character, achieving the purpose of adding speech feedback to the interaction content including the name of the virtual game character, which allows players to immerse themselves in the game plot and important prompts, and gain a better sense of identity, thereby enhancing the visual and auditory experience of the game, bringing a stronger sense of immersion for players, and improving the authenticity and interactivity of the virtual world in game scenarios.

Based on steps S202 to S206 of the present disclosure, the target request from the client is received, with the information carried in the target request including at least a target text, which is configured to represent a name of a virtual game character. The target text is converted into first speech data in response to the target request, and the first speech data is sent to the client, so that the client can splice the first speech data and the second speech data into the third speech data, with the second speech data being speech data corresponding to a content other than the name in the interaction content to be proceeded by the virtual game character. The above embodiments can be used to convert the target text configured to represent the name of the virtual game character into the first speech data, and splice the second speech data corresponding to the interaction content other than the name and the first speech data, achieving the purpose of adding speech feedback to the interaction content including the name of the virtual game character, and avoiding the fact that the name of the virtual game character is usually fed back in the form of a text. Moreover, the fact that the name of the virtual game character is skipped in the dialogue can also be avoided, and thus can solve the technical problem of poor interactivity for the name of the virtual game character, and improve the interactivity for the name of the virtual game character in games.

The further detailed introduction to method embodiments will be provided in the following.

In some embodiments, the method further includes obtaining style information of the second speech data, with the style information being configured to represent a speech style to which the second speech data belongs. The step S204 (where the target text is converted into the first speech data) includes converting the style information and the target text into the first speech data, with the speech style to which the first speech data belongs being the same as the speech style to which the second speech data belongs.

In some embodiments, the style information can be extracted from the second speech data. For example, the style information can be overall style information of the second speech data, which is configured to represent the speech style to which the second speech data belongs. In some embodiments, the style information can be a style vector, that is, the style information can be a mathematical vector configured to represent the style. In some embodiments, the above style information can be encoded to obtain style encoding information. In some embodiments, the second speech data can serve as a reference audio to the style of the first speech data. In some embodiments, the style encoding information of the second speech data and the above target text can be converted into the first speech data, so that the speech style to which the first speech data belongs is the same as the speech style to which the second speech data belongs. In some embodiments, the style information of the second speech data is used to control the style of the name of the virtual game character when played through a speech, so as to make the splicing of the first speech data synthesized from the target text and the second speech data naturally coherent, which can mainly include prosodic or rhythmic coherence as well as channel consistency.

In some embodiments, the text-to-speech system with the reference audio can include a reference audio encoder. The style information can be extracted from the second speech data through the reference audio encoder, and the style information can be then encoded to obtain the above style encoding information.

In some embodiments, obtaining the style information of the second speech data includes extracting a first acoustic feature of the second speech data, and determining the style information based on the first acoustic feature.

In some embodiments, when obtaining the style information of the second speech data, the first acoustic feature can be extracted from the second speech data first. The first acoustic feature, which is also referred to as a speech acoustic feature, can be a speech feature sequence. In some embodiments, the above text-to-speech system with the reference audio can include an acoustic feature extraction module, which can convert the second speech data from a waveform to some informative features, to obtain the first acoustic feature. In some embodiments, the first acoustic feature can be the Mel spectrogram.

After the first acoustic feature is extracted from the second speech data, the style information can be determined based on the first acoustic feature. In some embodiments, the reference audio encoder can include a neural network model. The neural network model can be used to perform information extraction and information compression on the above first acoustic feature input, to obtain the style vector. In some embodiments, the neural network model is a kind of an unsupervised learning model. After the style vector is obtained, the style encoding information can be then obtained by encoding the style vector.

In some embodiments, the above neural network model can include the Convolutional Neural Network (CNN) model and the Long Short Term Memory (LSTM) model. That is, the reference audio encoder is implemented based on CNN and LSTM.

In some embodiments, converting the style information and the target text into the first speech data includes extracting a text feature of the target text, obtaining an alignment result by aligning the text feature with the first acoustic feature, and converting the style information and the alignment result into the first speech data.

In some embodiments, when converting the style information and the target text into the first speech data, the text feature can be extracted from the target text first. The text feature can be a text feature sequence. In some embodiments, the above text-to-speech system with the reference audio can include a text encoder. The target text is inputted into the text encoder, and the target text can be processed by using the text encoder, to obtain the text feature. In some embodiments, the text encoder can map the target text to a high-dimensional text feature space encoding through a non-linear transformation, thereby obtaining the above text feature.

In some embodiments, since a data length of the text feature is different from a data length of the first acoustic feature (for example, the data length of the first acoustic feature is longer than the data length of the text feature), an alignment result can be obtained by aligning the text feature with the first acoustic feature after the text feature of the target text is extracted. In some embodiments, the above text-to-speech system with the reference audio can include an attention mechanism model. The alignment result can be obtained by using the attention mechanism model to align the text feature with the first acoustic feature. That is, an input of the above reference audio encoder and an input of the attention mechanism model are both for the same first acoustic feature.

In some embodiments, the information carried in the target request further includes first identification information of the virtual game character. The method further includes obtaining a target vector of the virtual game character based on the first identification information, with the target vector being configured to represent the timbre of the virtual game character. In some embodiments, converting the style information and the alignment result into the first speech data includes converting the target vector, the style information, and the alignment result into the first speech data.

In some embodiments, the information carried in the target request received by the server from the client can further include the first identification information of the virtual game character. The first identification information can be configured to uniquely identify the virtual game character, such as an identity document (ID), which can also be referred to as a target speaker ID. In some embodiments, the target vector of the virtual game character can be obtained based on the first identification information. In some embodiments, the first identification information is converted into the target vector, which is also referred to as a speaker vector. The target vector can be a vector table configured to represent the timbre of the virtual game character. In some embodiments, the above text-to-speech system with the reference audio can include a speaker vector table module, which can convert the first identification information into the target vector.

After obtaining the target vector of the virtual game character based on the first identification information, the server can convert the target vector, the style information, and the alignment result into the first speech data. The first speech data includes the timbre of the virtual game character, that is, the above target vector is used to control the timbre of the speech when the name of the virtual game character is played.

In some embodiments, the target vector and the style information mentioned above can also be inputted into the attention mechanism module, so that the target vector, the style information, and the alignment result is converted into the first speech data.

In some embodiments, converting the target vector, the style information, and the alignment result into the first speech data includes synthesizing the target vector, the style information, and the alignment result into a second acoustic feature, and converting the second acoustic feature into the first speech data.

In some embodiments, when converting the target vector, the style information, and the alignment result into the first speech data, the target vector, the style information, and the alignment result can be synthesized into the second acoustic feature. In some embodiments, the above text-to-speech system with the reference audio can include an acoustic decoder. The acoustic decoder can return the alignment result obtained by inputting the text feature and the first acoustic feature to the attention mechanism module, the target vector, and the style information to an acoustic feature space for an original speech through the non-linear transformation, to obtain the second acoustic feature. The second acoustic feature is also referred to as a predicted speech acoustic feature, which is then converted into the first speech data. In some embodiments, the above text-to-speech system with the reference audio can include a vocoder, which can convert the above second acoustic feature into a speech waveform/signal, thereby obtaining the first speech data.

In some embodiments, the information carried in the target request further includes second identification information of the second speech data, and the method further includes obtaining the second speech data based on the second identification information.

In some embodiments, the information carried in the target request received by the server from the client can further include the second identification information, and the second identification information can be configured to uniquely identify the second speech data, which can be referred to as a splicing audio ID.

In some embodiments, the method further includes converting the target text into a phoneme data sequence and/or a prosodic data sequence. The step S204 (where the target text is converted into the first speech data) includes converting the phoneme data sequence and/or the prosodic data sequence into the first speech data.

In some embodiments, the target text can be preprocessed before being converted into the first speech data. In some embodiments, the above text-to-speech system with the reference audio can include a text preprocessing module. The target text can be preprocessed through the text preprocessing module. In some embodiments, the target text is converted into corresponding phoneme data sequence and/or prosodic data sequence through the text preprocessing module, and the text preprocessing module can convert the target text into corresponding phoneme data sequence and/or prosodic data sequence through a series of rule-based or neural network models. The text feature can be extracted from the phoneme data sequence and/or the prosodic data sequence, which is then aligned with the first acoustic feature. The alignment result obtained, the target vector, and the style information will be converted into the first speech data.

In some embodiments, the above phoneme data sequence and prosodic data sequence can be combined to obtain a final phoneme prosodic data sequence.

In some embodiments, a text-to-phoneme model can be used to convert the target text into a corresponding phoneme data sequence. The text-to-phoneme model can be a neural network model using a CNN plus LSTM structure, which is trained using a cross-entropy loss function.

In some embodiments, a text-to-prosody model can be used to convert the target text into a corresponding prosodic data sequence. The text-to-prosody model can be a neural network model using an LSTM structure, which is trained using a cross-entropy loss function.

For example, if the target text inputted is "wǒ aì zhōng guó (I love China)", the target text can be processed through the text-to-phoneme model, and a phoneme data sequence "w o3 a i4 zh ong1 g uo2" can be obtained. The target text can also be processed through the text-to-prosody model, and a prosodic data sequence "#1 #1*#4" is obtained. The final phoneme prosodic data sequence can be "w o3 #1 a i4 #1 zh ong1 g uo2 #4".

It should be noted that in some embodiments, the reference audio encoder mentioned above can effectively obtain the style information of the second speech data, which is used finally in a stage of obtaining the first speech data. If the reference audio encoder is not used, the first speech data synthesized from the same target text will always be of the same style. That is, in the absence of the reference audio encoder for determining the style information, the attention mechanism module only receives the text feature outputted from the text encoder, the first acoustic feature outputted from the acoustic feature extraction module, and the target vector. According to embodiments of the present disclosure, the reference audio encoder is added, and the attention mechanism module additionally receives the style information (style encoding information) of the second speech data. Since the outputted text feature is fixed after the same target text is inputted into the text encoder, the synthesized first speech data basically has the same style under the condition that the first acoustic feature and the target vector remain unchanged. According to embodiments of the present disclosure, after the style encoding information of the second speech data is added, the entire style of the synthesized first speech data will be influenced by the style information of the second speech data. As a result, when different second speech data are used, the style of the first speech data synthesized from the same target text will change.

Furthermore, if the reference audio encoder is not used, the style of the first speech data synthesized from the target text may not be consistent when the second speech data is the same. This is because without the influence of the style information of the second speech data outputted from the reference audio encoder, the first speech data synthesized from the target text is generally greatly affected by the input of the target text. Therefore, the styles of the first speech data corresponding to different target texts may also be different sometimes. According to embodiments of the present disclosure, the style information of the second speech data outputted from the reference audio encoder is introduced, which allows using of the same style information of the second speech data when synthesizing different target texts, thereby maintaining consistency in the style of the first speech data synthesized from different target texts.

If the reference is not made to the style information of the second speech data outputted from the audio encoder, a location where the first speech data synthesized from the target text and the second speech data are spliced will be unnatural, mainly including incoherent prosody and rhythm and inconsistent channels. According to embodiments of the present disclosure, such problem can be effectively solved by using the style information of the second speech data outputted from the reference audio encoder, so that the first speech data synthesized from the target text and the second speech data are more natural and coherent when they are spliced.

A data processing method according to one or more embodiments of the present disclosure is also provided from a client side.

Figure 3:
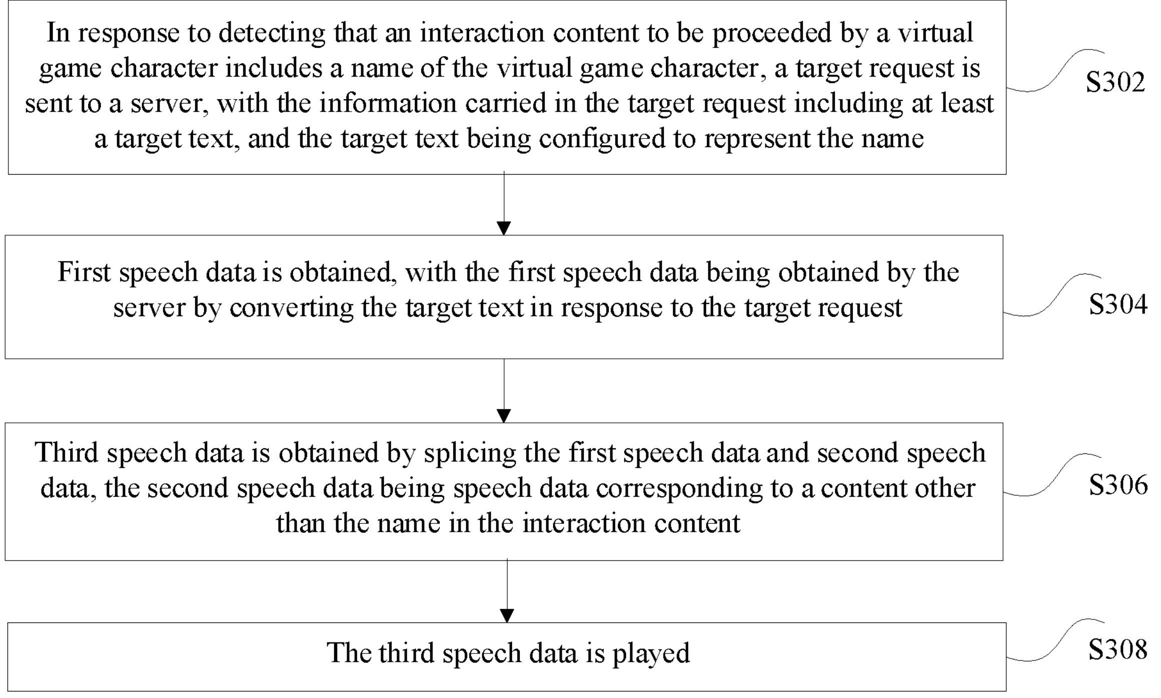
FIG. 3 is a flowchart of a data processing method according to one or more embodiments of the present disclosure.

FIG. 3 is a flowchart of a data processing method according to one or more embodiments of the present disclosure. As shown in FIG. 3, the method can include the following steps.

In step S302, in response to detecting that an interaction content to be proceeded by a virtual game character includes a name of the virtual game character, a target request is sent to a server, with the information carried in the target request including at least a target text, and the target text being configured to represent the name.

In some examples provided in the above step S302 of the present disclosure, the client can be a game client, and the virtual game character is included in a game scenario running on the game client. When the client detects that an interaction content to be proceeded by the virtual game character includes a name of the virtual game character, for example, when the client detects that the interaction content includes the name of the virtual game character named by a player, the client can send a target request to the server. The information carried in the target request includes at least a target text, which is also referred to as a name text to be synthesized, and the target text is configured to represent the name of the virtual game character mentioned above. In some embodiments, the interaction content can be a content of a dialogue carried out by virtual game characters.

In some embodiments, the above client can be provided on a mobile terminal or on a personal computer (PC), which is not specifically limited herein.

In step S304, first speech data is obtained, with the first speech data being obtained by the server by converting the target text in response to the target request.

In some examples provided in the above S304 of the present disclosure, after the client sends the target request to the server, the client obtains the first speech data. In some embodiments, the target text can be recognized by the server from the target request after the target request is received, and target text is then processed through the speech generation model, to obtain the first speech data that matches with the name of the virtual game character, thereby achieving the purpose of feedback on the name of the virtual game character through the first speech data.

In some embodiments, the client can obtain the first speech data returned by the server through a target interface. In some embodiments, the client obtains a speech stream returned by the server through the target interface. The speech stream includes byte stream data for the speech.

In step S306, third speech data is obtained by splicing the first speech data and second speech data, the second speech data being speech data corresponding to a content other than the name in the interaction content.

In the examples provided in the above step S306 of the present disclosure, after obtaining the first speech data, the client can splice the first speech data and the second speech data to obtain the third speech data.

In some embodiments, the current interaction content to be proceeded includes a content other than the name of the virtual game character, and the content other than the name of the virtual game character corresponds to the second speech data. The second speech data can be an audio, that is, the second speech data can be an audio to be spliced. After receiving the first speech data, the client can splice the above first speech data and the second speech data. In some embodiments, the client can splice the first speech data and the second speech data based on sampling points for the first speech data and sampling points for the second speech data. The sampling points include time information, which can be used to splice the first speech data and the second speech data, to obtain the third speech data.

In step S308, the third speech data is played.

In some examples provided in the above step S308 of the present disclosure, after obtaining the third speech data by splicing the first speech data and the second speech data, the client can play the third speech data. That is, the interaction content can be played through a speech, and thus achieving the purpose of playing the name of the virtual game character in the interaction content through the speech when the corresponding interaction content is carried out by the virtual game character.

It should be noted that in embodiments of the present disclosure, a duration for obtaining the target text to be synthesized is generally 0.5-1 second, and a waiting duration for the model to generate the first speech data corresponding to this segment of target text does not exceed 0.1 second. As a result, it will not take too long to splice the first speech data with the second speech data corresponding to the content other than the name of the virtual game character in the interaction content, and playing the obtained third speech data. Therefore, players should not feel the interruption of the playback of the entire interaction content.

According to embodiments of the present disclosure, when the game goes on to the interaction content to be proceeded by a corresponding virtual game character, and the interaction content includes the name of the virtual game character, the first speech data that matches with the name of the virtual game character can be returned by calling the target interface of the server. The client splices the first speech data returned by the server with the second speech data of the current dialogue, obtains the third speech data, and then plays the third speech data. That is, according to embodiments of the present disclosure, the speech feedback is added to the interaction content that includes the name of the virtual game character, which allows players to immerse themselves more in the game plot and important prompts, improving the authenticity and interactivity of the virtual world in the game, and optimizing the user experience.

The present disclosure will be further explained in the following based on embodiments given in more detail.

In the related art, in games on the mobile terminal and in PC games, after the player names a corresponding virtual game character in the game, the name of the virtual game character will be fed back in a text.

In the related art, after the player names a corresponding virtual game character in the game, the name of the virtual game character will be skipped in the speech of the virtual game character, and only other fixed text content can be read out, or the name of the virtual game character is fed back in a fixed speech. For example, the player can be called in other ways set by the game, for example, the player can be called as “Miss”, “Girl” or similar terms.

In the related art, the name chosen by the player for the virtual game character would be generally reflected only in a text chatting interface, a team interface, personal information and other functional interfaces, and there is no interaction between the virtual game character in the game and the name of the virtual game character, resulting in poor interactivity for the name of the virtual game character. In addition, in the related art, the name of the virtual game character does not receive attention in the speech data. The name of the virtual game character is lack of speech interaction, and generally returns only fixed speech contents (such as “Miss”, “Girl”, etc.), which leads to weak immersion for players when experiencing the game plot. Even in a first person perspective in games, the name customized by the player for the virtual game character would have not been truly used, resulting in a relatively fragmented understanding of the virtual game character and its own identity.

According to embodiments of the present disclosure, a speech of a corresponding virtual game character can be synthesized based on the name chosen by the player for the virtual game character in the game, in combination with an AI speech generation model, and the speech data that matches with the name of the virtual game character is fed back to the player. Detailed introduction to the methods will be provided in the following.

In some embodiments, the server configures speech generation models corresponding to each of virtual game characters in the game in advance. When the game goes on to a dialogue content to be proceeded by a corresponding virtual game character, and the dialogue content includes the name of the virtual game character, the speech data corresponding to the name can be returned by calling the target interface of the server. The client splices the speech data returned by the server that corresponds to the name onto the speech of the current dialogue content, and then plays the speech corresponding to the speech data after being spliced.

A method for converting a text corresponding to a name of a virtual game character to speech data according to one or more embodiments of the present disclosure will be introduced in the following from a server side.

Figure 4:
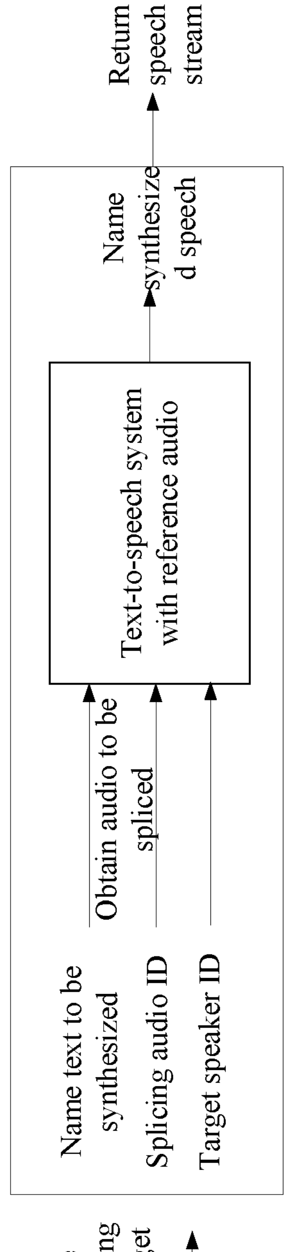
FIG. 4 is a schematic diagram of a text-to-speech server according to one or more embodiments of the present disclosure.

FIG. 4 is a schematic diagram of a text-to-speech server according to one or more embodiments of the present disclosure. As shown in FIG. 4, the target request sent from the client to the server includes a name text, a splicing audio ID, and a target speaker ID, to be synthesized. The splicing audio ID can be used to obtain an audio to be spliced. Then in the text-to-speech system with the reference audio, the name synthesized speech corresponding to the name of the virtual game character can be obtained by processing the name text to be synthesized, the audio to be spliced, and the target speaker ID, which will be returned to the client through in a speech stream.

The text-to-speech system with the reference audio according to one or more embodiments of the present disclosure will be further introduced in the following.

Figure 5:
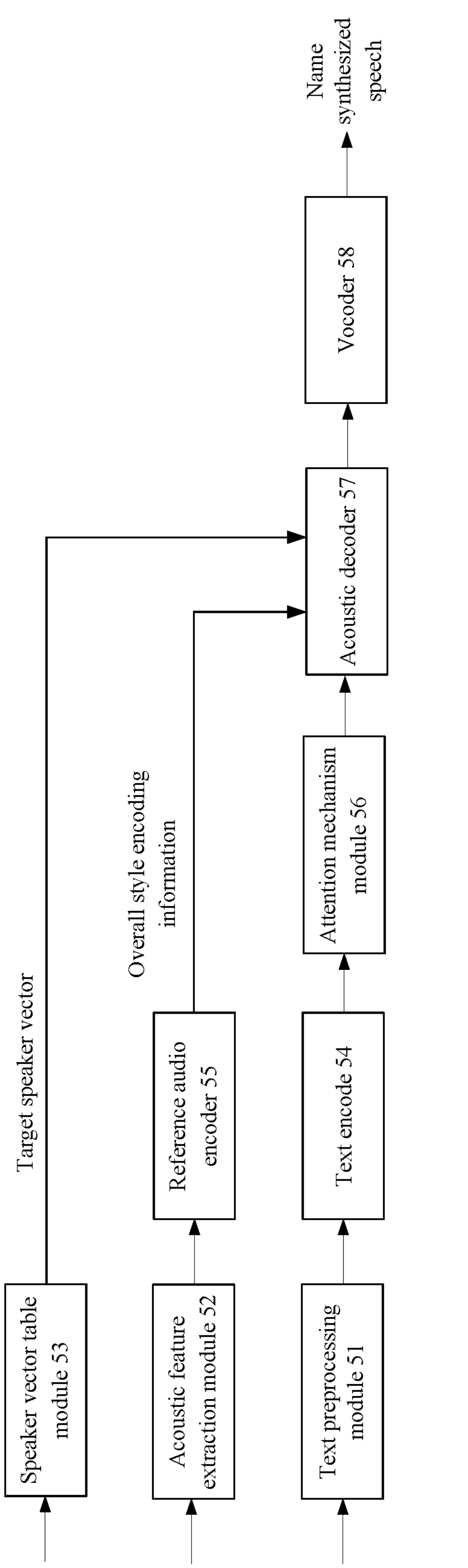
FIG. 5 is a schematic diagram of a text-to-speech system with a reference audio according to one or more embodiments of the present disclosure.

FIG. 5 is a schematic diagram of a text-to-speech system with a reference audio according to one or more embodiments of the present disclosure. As shown in FIG. 5, the text-to-speech system with the reference audio can include a text preprocessing module 51, an acoustic feature extraction module 52, a speaker vector table module 53, a text encoder 54, a reference audio encoder 55, an attention mechanism module 56, an acoustic decoder 57, and a vocoder 58.

The text preprocessing module 51 can be configured to convert a to-be-synthesized name text inputted by the system into the phoneme data sequence and the prosodic data sequence corresponding to the to-be-synthesized name text through a series of rule-based or neural network models.

In some embodiments, the text preprocessing module 51 can include the text-to-phoneme model, which uses a CNN plus LSTM structured neural network model and is trained using the cross-entropy loss function.

In some embodiments, the text preprocessing module 51 can include the text-to-prosody model, which uses an LSTM structured neural network model and is trained using the cross-entropy loss function.

For example, if the to-be-synthesized name text inputted is "wǒ aì zhōng guó (I love China)", the name text will be converted through the text-to-phoneme model, and a phoneme data sequence "w o3 a i4 zh ong1 g uo2" will be outputted. The name text will be converted through the text-to-prosody model, and a prosodic data sequence "#1 #1*#4" will be outputted. The phoneme data sequence is combined with the prosodic data sequence, to obtain the final phoneme prosodic data sequence "w o3 #1 a i4 #1 zh ong1 g uo2 #4".

The acoustic feature extraction module 52 can be configured to convert the splicing audio obtained from the splicing audio ID, from a waveform into some informative acoustic features. The acoustic feature can be the Mel spectrogram.

The speaker vector table module 53 can be configured to convert the target speaker ID into a target speaker vector, which is used to control the timbre of the speaker corresponding to the synthesized speech data.

The text encoder 54 can be configured to map the inputted phoneme prosodic data sequence to a high-dimensional text feature space encoding through a non-linear transformation, to obtain a text feature sequence.

The reference audio encoder 55 can be configured to receive the acoustic feature of the audio to be spliced, extract overall style information of the entire audio to be spliced (reference audio), encode the overall style information to obtain overall style encoding information.

In some embodiments, the reference audio encoder can be based on CNN and LSTM, and can be configured to perform information extraction and information compression on the acoustic feature of the inputted audio to be spliced, to finally obtain a mathematical vector for representing the style, i.e., a style vector. The method of perform information extraction and information compression on the acoustic feature of the audio to be spliced belongs to unsupervised learning.

The attention mechanism module 56 can be configured to align the text feature sequence and the speech feature sequence (the acoustic feature of the audio to be spliced) to obtain an alignment result, because the speech feature sequence is longer than the text feature sequence. The attention mechanism module 56 can also be configured to receive the overall style encoding information from the reference audio encoder 55 and the target speaker vector.

The acoustic decoder 57 can be configured to return the alignment result obtained by aligning the text feature sequence and the speech feature sequence through the attention mechanism module, the overall style encoding information and the target speaker vector, to an acoustic feature space for an original speech through the non-linear transformation, and return a predicted speech acoustic feature.

The vocoder 58 is configured to convert the above predicted speech acoustic feature into a speech waveform/signal, to obtain a name synthesized speech, and returns the name synthesized speech to the client in the speech stream. The client then splices the name synthesized speech onto the speech data of the speaker's current dialogue in the game, and plays the spliced speech data. The splicing can be performed by splicing of audio sampling points corresponding to speech data.

In some embodiments, the most important module in the text-to-speech server is the reference audio encoder, which can effectively encode the entire style of the audio to be spliced, extract the style information, and use finally the style information for the stage during which the name is synthesized into the speech. If the reference audio encoder is not used, the speech synthesized from the same name text will always be of the same style. That is, in the absence of the overall style encoding information of the reference audio outputted by the reference audio encoder, the attention mechanism module only receives the text feature sequence outputted from the text encoder, the acoustic feature outputted from the acoustic feature extraction module, and the speaker vector. According to embodiments of the present disclosure, the reference audio encoder is added, and the attention mechanism module additionally receives the overall style encoding information of the reference audio. Since the outputted text feature sequence is fixed after the same name text is inputted into the text encoder, the synthesized speech data basically has the same style under the condition that the acoustic feature and the speaker vector remain unchanged. According to embodiments of the present disclosure, after the overall style encoding information of the reference audio is added, the entire style of the synthesized speech data will be influenced by the overall style encoding information of the reference audio. As a result, when different reference audios are used, the style of the speech synthesized from the same name text will change.

Furthermore, if the reference audio encoder is not used, the style of the speech synthesized from the name text may not be consistent when the audio to be spliced in the same. This is because without the influence of the overall style encoding information of the reference audio outputted from the reference audio encoder, the speech synthesized from the name text is generally greatly affected by the input of the name text. Therefore, the styles of the synthesized speeches corresponding to different name texts may also be different sometimes. According to embodiments of the present disclosure, the overall style encoding information of the reference audio outputted from the reference audio encoder is introduced, which allows using of the same overall style encoding information of the reference audio when synthesizing different name texts, thereby maintaining consistency in the style of the speech synthesized from different name texts.

If the reference is not made to the overall style encoding information of the reference audio outputted from the reference audio encoder, a location where the speech synthesized from the name text and the audio to be spliced are spliced will be unnatural, mainly including incoherent prosody and rhythm and inconsistent channels. According to embodiments of the present disclosure, such problem can be effectively solved by using the overall style encoding information of the reference audio outputted from the reference audio encoder, so that the speech synthesized from the name text and the audio to be spliced are more natural and coherent when they are spliced.

According to embodiments of the present disclosure, a speech feedback method based on AI speech recognition is provided. The method can recognize the name of the virtual game character chosen by the player, and feed speech data that matches with the name of the virtual game character back to the player. That is, the methods according to one or more embodiments of the present disclosure achieve the purpose of adding speech feedback to the dialogue including the name of the virtual game character, and improve the authenticity and interactivity of the virtual world in the game, which allows players to immerse themselves in the game plot and important prompts, and gain a better sense of identity, thereby enhancing the visual and auditory experience of the game.

One or more embodiments of the present disclosure also provide a data processing apparatus. It should be noted that the data processing apparatus can be configured to implement the data processing method shown in the above embodiments of the present disclosure.

Figure 6:
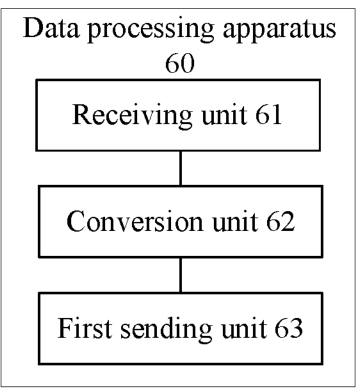
FIG. 6 is a schematic diagram of a data processing apparatus according to one or more embodiments of the present disclosure.

FIG. 6 is a schematic diagram of a data processing apparatus according to one or more embodiments of the present disclosure. As shown in FIG. 6, the data processing apparatus 60 can include a receiving unit 61, a conversion unit 62, and a first sending unit 63.

The receiving unit 61 is configured to receive a target request from a client, wherein information carried in the target request includes at least a target text, and the target text is configured to represent a name of a virtual game character.

The conversion unit 62 is configured to convert, in response to the target request, the target text into first speech data.

The first sending unit 63 is configured to send the first speech data to the client, wherein the first speech data is configured to be spliced with second speech data by the client to obtain third speech data, the second speech data being speech data corresponding to a content other than the name in an interaction content to be proceeded by the virtual game character.

One or more embodiments of the present disclosure also provide another data processing apparatus. It should be noted that the data processing apparatus can be configured to implement the data processing method shown in the above embodiments of the present disclosure.

Figure 7:
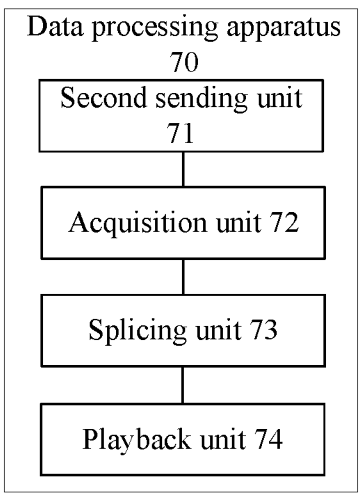
FIG. 7 is a schematic diagram of a data processing apparatus according to one or more embodiments of the present disclosure.

FIG. 7 is a schematic diagram of a data processing apparatus according to one or more embodiments of the present disclosure. As shown in FIG. 7, the data processing apparatus 70 can include a second sending unit 71, an acquisition unit 72, a splicing unit 73, and a playback unit 74.

The second sending unit 71 is configured to send, in response to detecting that an interaction content to be proceeded by a virtual game character includes a name of the virtual game character, a target request to a server, wherein information carried in the target request includes at least a target text, and the target text is configured to represent the name.

The acquisition unit 72 is configured to acquire first speech data, wherein the first speech data is obtained by the server by converting the target text in response to the target request.

The splicing unit 73 is configured to obtain third speech data by splicing the first speech data and second speech data, wherein the second speech data is speech data corresponding to a content other than the name in the interaction content.

The playback unit is configured to play the third speech data.

The data processing apparatus according to one or more embodiments of the present disclosure can be used to convert the target text configured to represent the name of the virtual game character into the first speech data, and splice the second speech data corresponding to the interaction content other than the name and the first speech data, achieving the purpose of adding speech feedback to the interaction content including the name of the virtual game character, and avoiding the fact that the name of the virtual game character is usually fed back in the form of a text. Moreover, the fact that the name of the virtual game character is skipped in the dialogue can also be avoided, and thus can solve the technical problem of poor interactivity for the name of the virtual game character, and improve the interactivity for the name of the virtual game character in games.

One or more embodiments of the present disclosure also provide a non-transitory computer-readable storage medium. The non-transitory computer-readable storage medium stores a computer program. When the computer program is executed by a processor, a device on which the non-transitory computer-readable storage medium is located is controlled to implement the data processing method provided in one or more embodiments of the present disclosure, including: receiving a target request from a client, the information carried in the target request including at least a target text, and the target text is configured to represent a name of a virtual game character: converting, in response to the target request, the target text into first speech data; and sending the first speech data to the client, the first speech data being configured to be spliced with second speech data by the client to obtain third speech data, the second speech data being speech data corresponding to a content other than the name in an interaction content to be proceeded by the virtual game character.

In some embodiments, the method further includes obtaining style information of the second speech data, the style information being configured to represent a speech style to which the second speech data belongs, and converting the target text into the first speech data includes converting the style information and the target text into the first speech data, a speech style to which the first speech data belongs being the same as the speech style to which the second speech data belongs.

In some embodiments, obtaining the style information of the second speech data includes extracting a first acoustic feature of the second speech data; and determining the style information based on the first acoustic feature.

In some embodiments, converting the style information and the target text into the first speech data includes extracting a text feature of the target text: obtaining an alignment result by aligning the text feature and the first acoustic feature; and converting the style information and the alignment result into the first speech data.

In some embodiments, the information carried in the target request further includes first identification information of the virtual game character: the method further includes obtaining a target vector of the virtual game character based on the first identification information, the target vector being configured to represent a timbre of the virtual game character; and converting the style information and the alignment result into the first speech data includes converting the target vector, the style information, and the alignment result into the first speech data.

In some embodiments, converting the target vector, the style information, and the alignment result into the first speech data includes synthesizing the target vector, the style information, and the alignment result into a second acoustic feature; and converting the second acoustic feature into the first speech data.

In some embodiments, the information carried in the target request further includes second identification information of the second speech data, and the method further includes obtaining the second speech data based on the second identification information.

In some embodiments, the method further includes converting the target text into a phoneme data sequence and/or a prosodic data sequence; and converting the target text into the first speech data includes converting the phoneme data sequence and/or the prosodic data sequence into the first speech data.

The device on which the non-transitory computer-readable storage medium is located is controlled to implement the data processing method provided in one or more embodiments of the present disclosure, including: sending, in response to detecting that an interaction content to be proceeded by a virtual game character includes a name of the virtual game character, a target request to a server, the information carried in the target request including at least a target text, and the target text being configured to represent the name: acquiring first speech data, the first speech data being obtained by the server by converting the target text in response to the target request: obtaining third speech data by splicing the first speech data and second speech data, the second speech data being speech data corresponding to a content other than the name in the interaction content; and playing the third speech data.

According to the above embodiments, the target text configured to represent the name of the virtual game character is converted into the first speech data, and the second speech data corresponding to the interaction content other than the name and the first speech data are spliced, achieving the purpose of adding speech feedback to the interaction content including the name of the virtual game character, and avoiding the fact that the name of the virtual game character is usually fed back in the form of a text. Moreover, the fact that the name of the virtual game character is skipped in the dialogue can also be avoided, and thus solving the technical problem of poor interactivity for the name of the virtual game character, and improving the interactivity for the name of the virtual game character in games.

In some embodiments, the above-mentioned storage media can include, but are not limited to, media that can store the computer program, such as USB flash drive, read only memory (ROM), random access memory (RAM), portable hard drives, magnetic disks, or optical discs, etc.

Figure 8:
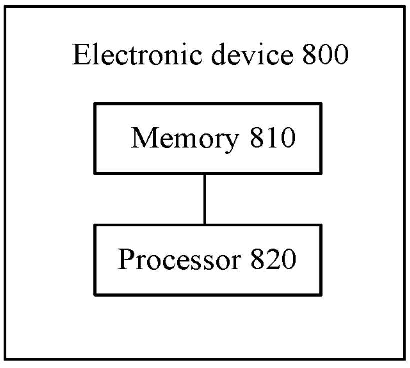
FIG. 8 is a block diagram of a structure of an electronic device according to one or more embodiments of the present disclosure.

One or more embodiments of the present disclosure also provide an electronic device 800 as shown in FIG. 8. The electronic device includes a memory 810 and a processor 820. A computer program is stored in the memory and the processor is configured to execute the computer program to cause any of steps in data processing method embodiments to be executed, the method including: receiving a target request from a client, the information carried in the target request including at least a target text, and the target text is configured to represent a name of a virtual game character: converting, in response to the target request, the target text into first speech data; and sending the first speech data to the client, the first speech data being configured to be spliced with second speech data by the client to obtain third speech data, the second speech data being speech data corresponding to a content other than the name in an interaction content to be proceeded by the virtual game character.

In some embodiments, the method further includes obtaining style information of the second speech data, the style information being configured to represent a speech style to which the second speech data belongs, and converting the target text into the first speech data includes converting the style information and the target text into the first speech data, a speech style to which the first speech data belongs being the same as the speech style to which the second speech data belongs.

In some embodiments, obtaining the style information of the second speech data includes extracting a first acoustic feature of the second speech data; and determining the style information based on the first acoustic feature.

In some embodiments, converting the style information and the target text into the first speech data includes extracting a text feature of the target text: obtaining an alignment result by aligning the text feature and the first acoustic feature; and converting the style information and the alignment result into the first speech data.

In some embodiments, the information carried in the target request further includes first identification information of the virtual game character: the method further includes obtaining a target vector of the virtual game character based on the first identification information, the target vector being configured to represent a timbre of the virtual game character; and converting the style information and the alignment result into the first speech data includes converting the target vector, the style information, and the alignment result into the first speech data.

In some embodiments, converting the target vector, the style information, and the alignment result into the first speech data includes synthesizing the target vector, the style information, and the alignment result into a second acoustic feature; and converting the second acoustic feature into the first speech data.

In some embodiments, the information carried in the target request further includes second identification information of the second speech data, and the method further includes obtaining the second speech data based on the second identification information.

In some embodiments, the method further includes converting the target text into a phoneme data sequence and/or a prosodic data sequence; and converting the target text into the first speech data includes converting the phoneme data sequence and/or the prosodic data sequence into the first speech data.

The processor is configured to execute the computer program to cause any of steps in data processing method embodiments to be executed, the method including: sending, in response to detecting that an interaction content to be proceeded by a virtual game character includes a name of the virtual game character, a target request to a server, the information carried in the target request including at least a target text, and the target text being configured to represent the name: acquiring first speech data, the first speech data being obtained by the server by converting the target text in response to the target request: obtaining third speech data by splicing the first speech data and second speech data, the second speech data being speech data corresponding to a content other than the name in the interaction content; and playing the third speech data.

According to the above embodiments, the target text configured to represent the name of the virtual game character is converted into the first speech data, and the second speech data corresponding to the interaction content other than the name and the first speech data are spliced, achieving the purpose of adding speech feedback to the interaction content including the name of the virtual game character, and avoiding the fact that the name of the virtual game character is usually fed back in the form of a text. Moreover, the fact that the name of the virtual game character is skipped in the dialogue can also be avoided, and thus can solve the technical problem of poor interactivity for the name of the virtual game character, and improve the interactivity for the name of the virtual game character in games.

In some embodiments, the above-mentioned electronic device can also include a transmission device and an input/output device. The transmission device is connected to the above processor, and the input/output device is connected to the above processor.

It is apparent that those skilled in the art should understand that various modules or steps disclosed herein can be implemented using a general computing device, which can be concentrated on a single computing device or distributed on a network composed of multiple computing devices. Optionally, the various modules or steps disclosed herein can be implemented using program codes executable by the computing device, so that the program codes can be stored in a storage device and can be executed by the computing device. In some cases, the steps shown or described can be executed in an order other than that provided herein, or they can be made into individual integrated circuit module. Alternatively, multiple modules or steps can be made into a single integrated circuit module. The present disclosure is not limited to any specific combination of hardware and software.

The above is only some embodiments of the present disclosure, rather than limit the present disclosure. It should be noted that for those skilled in the art, various modifications and improvements can be made. Any modifications, equivalent replacements, improvements, etc. made within the principle of the present disclosure shall be included in the protection scope of the present disclosure.

What is claimed is:

1. A method for outputting speech data, comprising:

receiving, by a server, a target request from a client, wherein information carried in the target request comprises a target text, and the target text is configured to represent a name of a virtual game character;

converting, by the server, the target text into first speech data in response to the target request; and sending, by the server, the first speech data to the client, wherein the first speech data is used by the client to output and play a third speech data with a consistent speech style, the third speech data is obtained by splicing the first speech data with second speech data, and the second speech data comprises a content other than the name of the virtual game character in an interaction content to be proceeded by the virtual game character;

wherein the method further comprises obtaining style information of the second speech data, comprising:

extracting a first acoustic feature of the second speech data; and determining the style information based on the first acoustic feature, wherein the style information is configured to represent a speech style of the second speech data;

wherein converting the target text into the first speech comprises:

extracting a text feature of the target text;

obtaining an alignment result by aligning the text feature and the first acoustic feature; and converting the style information and the alignment result into the first speech data, wherein a speech style of the first speech data is the same as the speech style of the second speech data.

2. The method according to claim 1, wherein the information carried in the target request further comprises first identification information of the virtual game character, and the method further comprises:

obtaining a target vector of the virtual game character based on the first identification information, wherein the target vector is configured to represent a timbre of the virtual game character; and wherein converting the style information and the alignment result into the first speech data comprises:

converting the target vector, the style information, and the alignment result into the first speech data.

3. The method according to claim 2, wherein converting the target vector, the style information, and the alignment result into the first speech data comprises:

synthesizing the target vector, the style information, and the alignment result into a second acoustic feature; and converting the second acoustic feature into the first speech data.

4. The method according to claim 1, wherein the information carried in the target request further comprises second identification information of the second speech data, and the method further comprises:

obtaining the second speech data based on the second identification information.

5. The method according to claim 1, further comprising:

converting the target text into a phoneme data sequence or a prosodic data sequence; and wherein converting the target text into the first speech data comprises:

converting the phoneme data sequence or the prosodic data sequence into the first speech data.

6. A method for outputting speech data, comprising:

sending, in response to detecting that an interaction content to be proceeded by a virtual game character comprises a name of the virtual game character, sending, by a client, a target request to a server, wherein information carried in the target request comprises a target text, and the target text is configured to represent the name of the virtual game character;

acquiring, by the client, first speech data, wherein the first speech data is obtained by the server by converting the target text in response to the target request;

obtaining, by the client, third speech data by splicing the first speech data and second speech data, wherein the second speech data comprises a content other than the name of the virtual game character in the interaction content; and playing, by the client, the third speech data with a consistent speech style;

wherein converting the target text into the first speech by the server, comprises:

obtaining, by the server, style information of the second speech data, comprising:

extracting a first acoustic feature of the second speech data; and determining the style information based on the first acoustic feature, wherein the style information is configured to represent a speech style of the second speech data;

extracting a text feature of the target text;

obtaining an alignment result by aligning the text feature and the first acoustic feature; and converting the style information and the alignment result into the first speech data, wherein a speech style of the first speech data is the same as the speech style of the second speech data.

7. A non-transitory computer-readable storage medium having a computer program stored thereon, wherein a device on which the non-transitory computer-readable storage medium is located is controlled to implement the method according to claim 1 when the computer program is executed by a processor.

8. An electronic device comprising a memory and a processor, wherein the memory stores a computer program executable by the processor, and the processor is configured to:

receive a target request from a client, wherein information carried in the target request comprises a target text, and the target text is configured to represent a name of a virtual game character;

convert the target text into first speech data in response to the target request; and send the first speech data to the client, wherein the first speech data is used by the client to output and play a third speech data with a consistent speech style, the third speech data is obtained by splicing the first speech data with second speech data, and the second speech data comprises a content other than the name of the virtual game character in an interaction content to be proceeded by the virtual game character;

wherein the processor is configured to:

extract a first acoustic feature of the second speech data; and determine the style information based on the first acoustic feature to obtain style information of the second speech data, wherein the style information is configured to represent a speech style of the second speech data;

wherein the processor is further configured to convert the target text into the first speech by:

extracting a text feature of the target text;

obtaining an alignment result by aligning the text feature and the first acoustic feature; and converting the style information and the alignment result into the first speech data, wherein a speech style of the first speech data is the same as the speech style of the second speech data.

9. The electronic device according to claim 8, wherein the information carried in the target request further comprises first identification information of the virtual game character, and the processor is further configured to:

obtain a target vector of the virtual game character based on the first identification information, wherein the target vector is configured to represent a timbre of the virtual game character; and wherein the processor is further configured to convert the target vector, the style information, and the alignment result into the first speech data.

10. The electronic device according to claim 9, wherein the processor is further configured to:

synthesize the target vector, the style information, and the alignment result into a second acoustic feature; and convert the second acoustic feature into the first speech data.

11. The electronic device according to claim 8, wherein the information carried in the target request further comprises second identification information of the second speech data, and the processor is further configured to:

obtain the second speech data based on the second identification information.

12. The electronic device according to claim 8, wherein the processor is further configured to:

convert the target text into a phoneme data sequence or a prosodic data sequence; and wherein the processor is further configured to convert the phoneme data sequence or the prosodic data sequence into the first speech data.

13. An electronic device comprising a memory and a processor, wherein the memory stores a computer program, and the processor is configured to execute the computer program to cause the method according to claim 6 to be implemented.

14. The method according to claim 1, further comprising:

converting the target text into a phoneme data sequence and a prosodic data sequence; and obtaining a final phoneme prosodic data sequence by combining the phoneme data sequence and the prosodic data sequence; and wherein converting the target text into the first speech data comprises:

converting the final phoneme prosodic data sequence into the first speech data.

* * * * *